(12) United States Patent
Duffy et al.

(10) Patent No.: US 7,211,147 B2
(45) Date of Patent: May 1, 2007

(54) APPARATUS FOR THE APPLICATION OF FLUOROPOLYMER COATING TO INTERNALLY THREADED FASTENERS

(75) Inventors: Richard Duffy, Shelby Township, MI (US); Eugune Sessa, Harrison Township, MI (US)

(73) Assignee: Nylok Corporation, Macomb, MI (US)

( * ) Notice: Subject to any disclaimer, the term of this patent is extended or adjusted under 35 U.S.C. 154(b) by 0 days.

(21) Appl. No.: 11/294,272

(22) Filed: Dec. 5, 2005

(65) Prior Publication Data

US 2006/0070572 A1    Apr. 6, 2006

Related U.S. Application Data

(62) Division of application No. 10/428,162, filed on May 1, 2003, now Pat. No. 6,972,137.

(51) Int. Cl.
    *B05B 13/06* (2006.01)
    *B05B 13/02* (2006.01)
    *B05C 19/00* (2006.01)
(52) U.S. Cl. ........................ 118/317; 118/308; 118/324
(58) Field of Classification Search ................ 118/308, 118/309, 306, 317, DIG. 7, 324; 427/181, 427/230, 195; 470/19
    See application file for complete search history.

(56) References Cited

U.S. PATENT DOCUMENTS

| | | | | |
|---|---|---|---|---|
| 4,262,038 A | * | 4/1981 | Wallace | 427/181 |
| 4,311,113 A | * | 1/1982 | Jordan | 118/629 |
| 5,571,323 A | * | 11/1996 | Duffy et al. | 118/308 |
| 6,296,573 B1 | * | 10/2001 | Duffy et al. | 470/18 |

* cited by examiner

*Primary Examiner*—Yewebdar Tadesse
(74) *Attorney, Agent, or Firm*—Niro, Scavone, Haller & Niro

(57) ABSTRACT

An apparatus for the application of a fluoropolymer coating to the threads of an internally threaded fastener. The fastener has a body and a threaded bore extending to opposing ends of the body to define opposing first and second openings in the fastener. A conveyor moves the fastener along a path of travel with its threaded bore in a predetermined orientation. An obstruction member closes, the first opening, while a nozzle directs an air stream carrying entrained fluoropolymer powder through the second opening and into the threaded bore. The nozzle is stationary and is located at an axially displaced position relative to the second opening of the fastener and immediately adjacent the conveyor. A heating station heats the fluoropolymer powder to its melting temperature causing it to melt and fuse into a generally continuous film covering the fastener's threads.

4 Claims, 3 Drawing Sheets

APPARATUS FOR THE APPLICATION OF FLUOROPOLYMER COATING TO INTERNALLY THREADED FASTENERS

This application is a divisional of prior application Ser. No. 10/428,162, filed May 1, 2003 now U.S. Pat. No. 6,972,137.

BACKGROUND OF THE INVENTION

The present invention relates generally to coatings for threaded fasteners. More particularly, the invention relates to a process and apparatus for the application of fluoropolymer coatings onto the threads of internally threaded fasteners.

It is now well known that fluoropolymer coatings may be advantageously employed to mask or protect the threaded portions of fasteners from various contaminants, such as paint primer, anticorrosion materials, weld spatter and the like. A preferred technology for the application of these coatings uses a fluoropolymer which is applied in dry powder form and is heated to form a thin continuous coating over the fastener threads. Typically, the powdered fluoropolymer is entrained in an air stream which is directed onto the threads of the fastener by means of specially designed nozzles. Examples of this preferred technology are illustrated in U.S. Pat. Nos. 4,835,819, 5,221,170, 6,156,392 and 6,395,346, whose disclosers are incorporated herein by reference.

One problem with the known prior art processes occur when coating internally threaded fasteners. Because of the need for generally uniform and continuous coatings, it has heretofore been the practice to insert the nozzle within the threaded bore of the fastener during powder application. This practice requires a reciprocating nozzle design which can be mechanically complex and costly. It also results in generally lower production rates as compared with other powdered coating techniques with a stationary nozzle design.

It would be desirable, therefore, to employ a stationary nozzle design for the application of fluoropolymer coatings to internally threaded fasteners, while still maintaining a high degree of coating uniformity and continuity over the fastener threads.

SUMMARY OF THE INVENTION

In accordance with the present invention, it has been found that uniform and continuous fluoropolymer coatings may be obtained across the threads of internally threaded fasteners, using a stationary nozzle positioned adjacent one end of the fastener. Surprisingly, the desired coating is achieved, in part, by blocking or closing the opposite end of the fastener while the powder is applied.

In one aspect of the invention, a process and apparatus are provided for the application of a fluoropolymer coating to the threads of an internally threaded fastener. The fastener has a body and a threaded bore extending to opposing ends of the body to define opposing first and second openings in the fastener. The fastener is moved on a conveyor along a path of travel with its threaded bore in a predetermined orientation. As the fastener moves along its path of travel, the first opening is closed by means of an obstructing member, while an air stream carrying entrained fluoropolymer powder is directed from a nozzle through the second opening and into the threaded bore. The nozzle is stationary and is located at an axially displaced position relative to the second opening of the fastener and immediately adjacent the conveyor. Preferably, the nozzle includes a diffuser which directs the air stream and entrained fluoropolymer powder into the fastener bore in a diverging pattern. After the fluoropolymer powder is deposited onto the threads of the fastener, the conveyor moves the fastener through a heating station where the fluoropolymer powder is raised to its melting temperature causing it to melt and fuse into a generally continuous film covering the fastener's threads.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENTS

The process and apparatus of the present invention may be advantageously used with any variety of internally threaded fasteners. Such fasteners include a fastener body having a threaded bore extending to the opposing ends of the body, thereby defining first and second openings at each end of the fastener body. The fasteners may be supplied as individual items, in bulk, or strung together on a wire and supplied on a reel.

Figure 1:
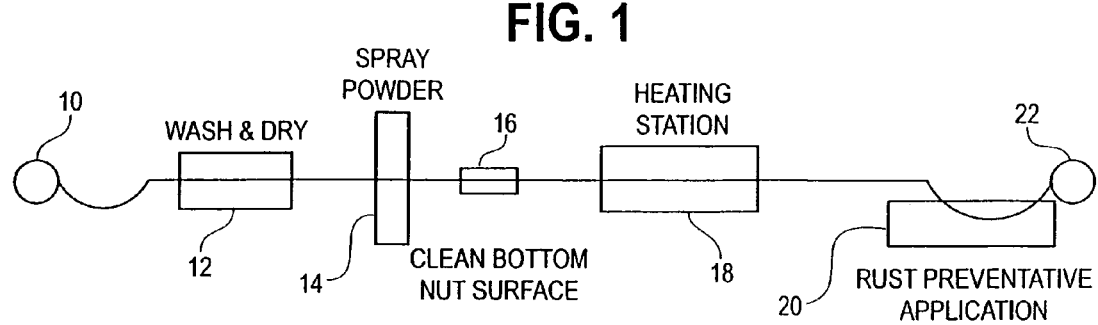
FIG. 1 is a schematic illustration of an exemplary embodiment, showing the overall arrangement of a process and apparatus for application of fluoropolymer onto threaded fasteners in which the present invention finds particular utility.

FIG. 1 illustrates a process for applying fluoropolymer to the threads of internally threaded fasteners where the fasteners are joined by a wire carrier and supplied from a feed reel 10. The fasteners are conveyed from the feed reel through a washing station 12, a powder application station 14, a cleaning station 16, a heating station 18 and an anticorrosion station 20, and finally to a take up reel 22.

Any of a variety of fastener conveyors well known to those of skill in the art can be used to move the fasteners along a path of travel through the various processing stations. Where the fasteners are supplied loose in bulk, conveyors as shown in U.S. Pat. Nos. Re. 33,766, 5,792,512, and U.S. Pat. No. 6,296,573 B1 may be used.

Figure 2:
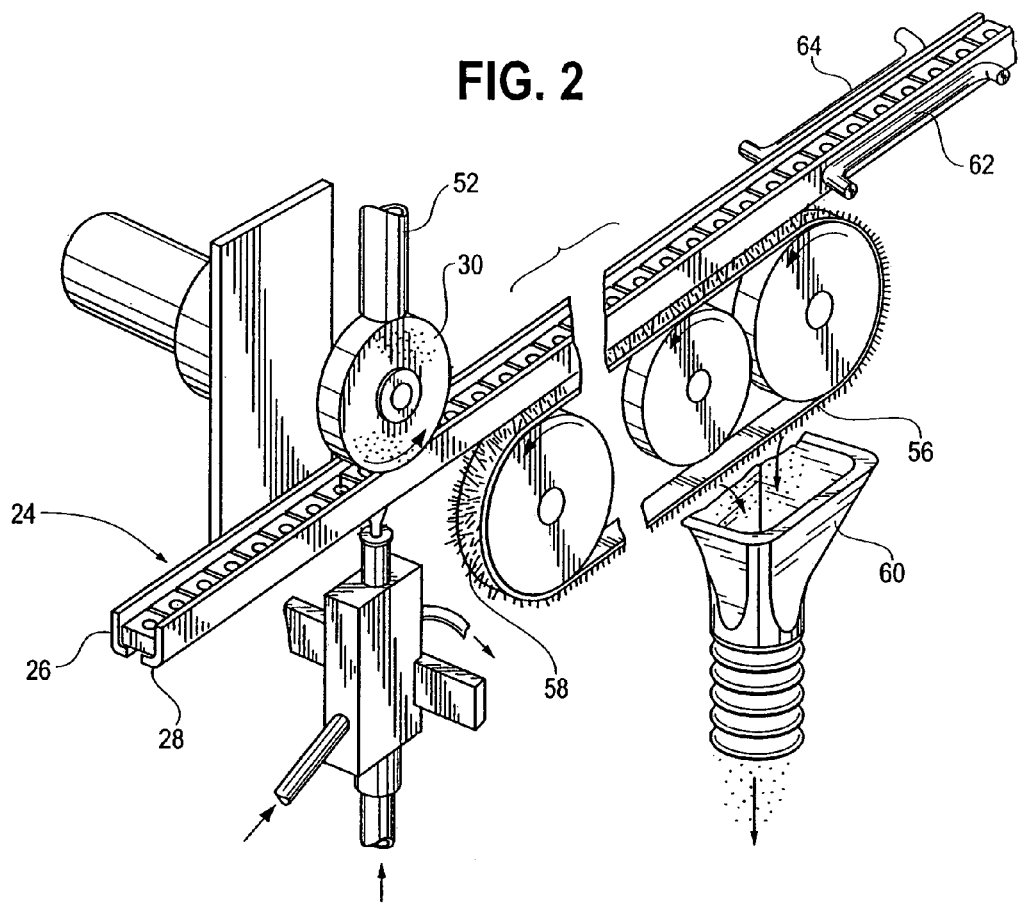
FIG. 2 is a perspective view illustrating details of construction for one preferred embodiment of the present invention.
Figure 3:
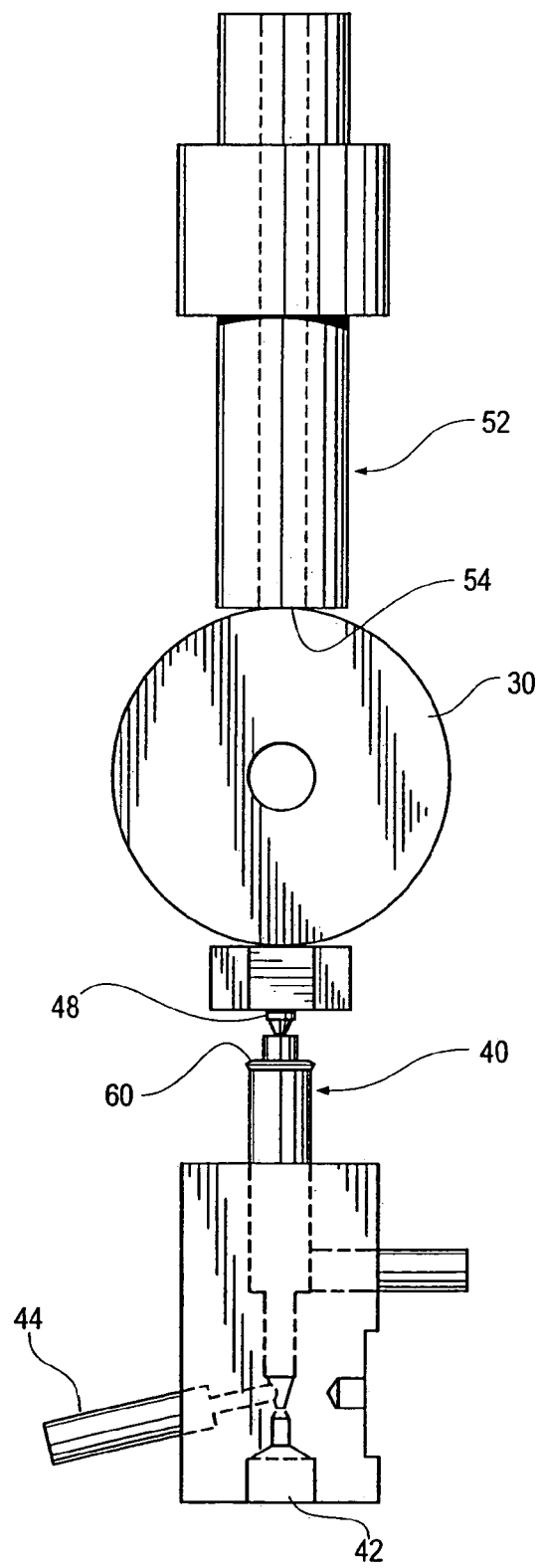
FIG. 3 is a side elevational view showing further structural details for a powdered fluoropolymer application station employed in one preferred embodiment.
Figure 4:
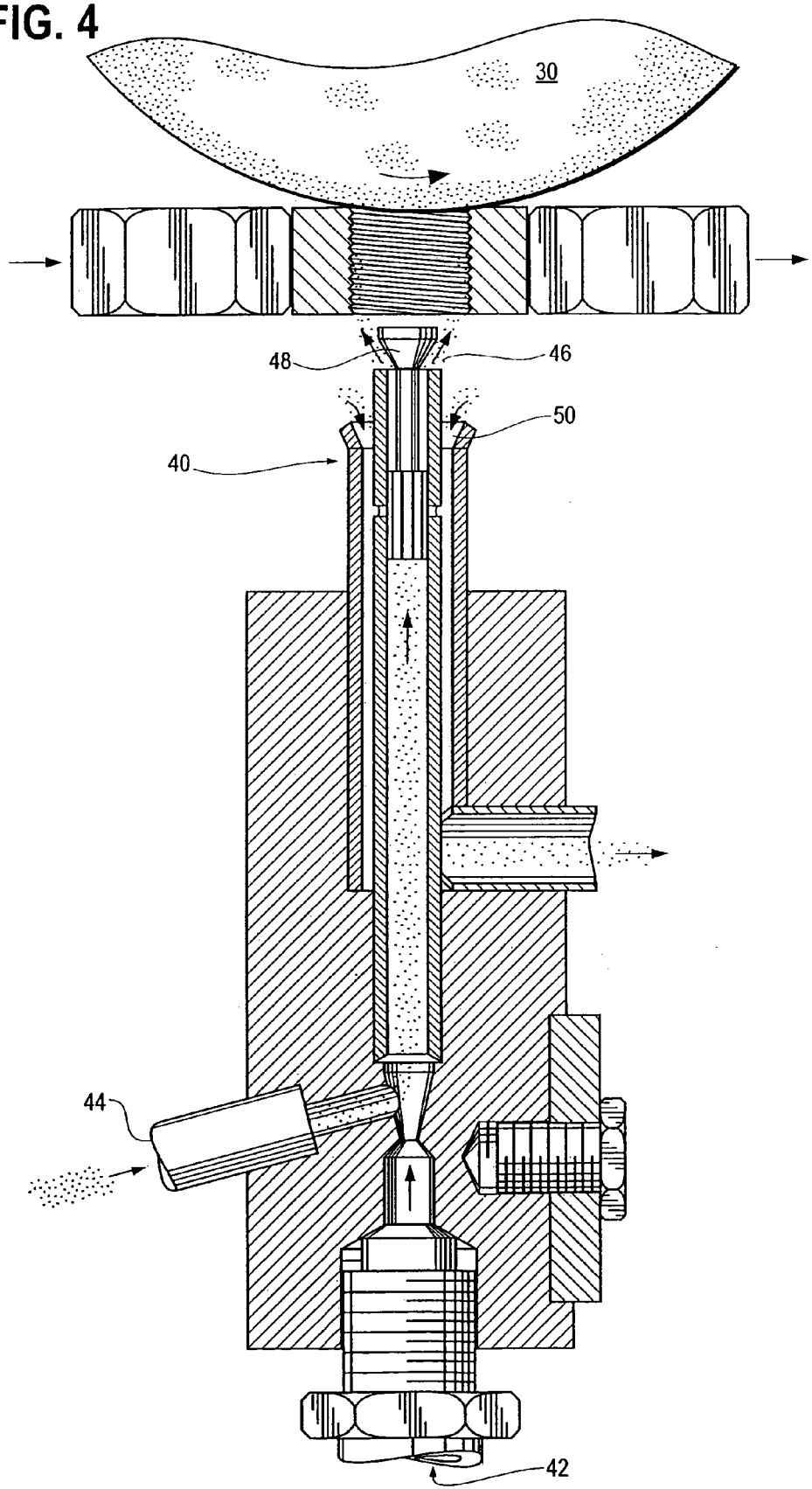
FIG. 4 is another side elevational view in partial cross section and illustrating still further structural details for the application station shown in FIG. 3.

When the fasteners are strung on a carrier wire, the conveyor may take the form of a track 24, as shown in FIG. 2, having parallel channel rails 26 and 28, with the fasteners being moved along the desired path of travel by one or more drive wheels 30.

At the powder application station, the fastener's first opening (as shown in the drawings, the "first" opening is at the top of the fastener body) is closed by an appropriate obstructing member which may take the form of a plate or belt or, as illustrated, a rotating wheel. Thus, in the preferred embodiment, wheel 30 serves both to move the fasteners along the track 24 and to close the upper opening of each fastener as it passes through the powder application station. Wheel 30 may be made of rubber-neoprene or polyurethane with a durometer range of Shore A 30 to 70. Alternately, the wheel should be soft enough in construction to form a seal so as to close the upper opening of each fastener.

While the first or upper opening of the fastener is closed by wheel 30, an air stream carrying entrained fluoropolymer powder is directed from nozzle 40 through the second or lower opening and into the threaded bore of the fastener.

The nozzle 40 is stationary and is positioned immediately adjacent the fasteners' path of travel. The nozzle 40 includes a pressurized air inlet 42, a powder inlet 44 and an outlet port 46 which directs the air stream and entrained fluoropolymer powder into the fastener's threaded bore. Preferably, the nozzle also includes a diffuser or deflector 48 axially mounted within outlet port 46 which generates a diverging air stream carrying the fluoropolymer powder into the fastener bore. The angle of the diffuser or deflector is preferably 60 degrees from the axis of the outlet port, however, a range between 30 to 80 degrees may be used as well. An annular vacuum port 50 may also be situated adjacent outlet port 46 to collect fluoropolymer powder which is not deposited on the threads of the fastener. The vacuum level may be adjusted to control the uniformity of the powder coating deposited onto the threads of the fastener. For larger sized fasteners, it has been found that more vacuum may need to be used to maintain a uniform coating. The amount of coating applied to the fastener may be determined by the volume of powder applied and the number of powder applications.

The wheel 30 may pick up fluoropolymer powder on its outer circumferential surface, and this powder may be removed by a vacuum cleaner 52 whose port 54 is positioned adjacent the wheels circumference.

Any fluoropolymer powder deposited on the lower surface of the fastener may be removed at the cleaning station 16. In the preferred embodiment this cleaning is accomplished using a belt 56 with bristles or a Velcro surface 58. Once again the powder build up on the cleaning belt 56 may be removed via vacuum cleaner 60.

The fluoropolymer powder collected from vacuum devices 50, 52 and 60 may be recirculated to the powder supply which feeds nozzle 40.

After the fluoropolymer powder is deposited on the fastener's threads, the fastener moves through a heating station, such as induction heater elements 62 and 64 to raise the fluoropolymer to its melting temperature whereby the individual powder particles melt and fuse into a generally uniform and continuous film coating. A preferred particle size is from 20 microns to 35 microns.

As those of skill in the art will appreciate, the process and apparatus of the present invention is mechanically simple, requiring only very basic mechanical components. Because there is no need to reciprocate the powder application nozzle into and out of the fastener bore, the fasteners may move continuously and production rates may be enhanced.

We claim:

1. An apparatus for the application of a fluoropolymer coating to the threads of an internally threaded fastener, said fastener having a body and a threaded bore extending through the body to opposing ends of the body to thereby define first and second opposing openings in the fastener, said apparatus comprising:

a conveyor to move the fastener along a path of travel with the fastener's threaded bore in a predetermined orientation;

an obstruction member positioned adjacent the fastener path of travel and having a surface which engages an end of the fastener body and closes the first opening of the fastener;

a stationary nozzle positioned adjacent the fastener path of travel and axially displaced from the second opening of the fastener, said nozzle having a pressurized air input, a fluoropolymer powder input and a outlet port to thereby direct an air stream carrying entrained fluoropolymer powder through the second opening and into the bore of the fastener while the first opening is closed by the obstruction member, thereby forming a fluoropolymer powder coating on the threads of the fastener;

a heating element positioned along the fastener path of travel to heat the fluoropolymer powder to its melting point to form a fluoropolymer film on the threads of the fastener.

2. The apparatus of claim 1 wherein the obstruction member is a rotating wheel having an outer surface which abuts the end of the fastener and thereby closes the first opening of the fastener.

3. The apparatus of claim 1 wherein the nozzle outlet port includes a diffuser so that the air stream carrying the entrained fluoropolymer powder is discharged in a diverging pattern.

4. The apparatus of claim 1 wherein the nozzle includes an annular vacuum port adapted to collect fluoropolymer powder not deposited on the threads of the fastener.

* * * * *